United States Patent
Seo et al.

(10) Patent No.: US 6,937,981 B2
(45) Date of Patent: Aug. 30, 2005

(54) VOICE RECOGNITION SYSTEM

(75) Inventors: Hiroshi Seo, Saitama (JP); Mitsuya Komamura, Saitama (JP); Soichi Toyama, Saitama (JP)

(73) Assignee: Pioneer Corporation, Tokyo (JP)

( * ) Notice: Subject to any disclaimer, the term of this patent is extended or adjusted under 35 U.S.C. 154(b) by 513 days.

(21) Appl. No.: 09/954,151

(22) Filed: Sep. 18, 2001

(65) Prior Publication Data

US 2002/0035472 A1 Mar. 21, 2002

(30) Foreign Application Priority Data

Sep. 18, 2000 (JP) .................................. P. 2000-282348

(51) Int. Cl.$^7$ ............................................. G10L 17/00
(52) U.S. Cl. ..................... 704/246; 704/256; 704/255; 704/243
(58) Field of Search ................................ 704/246, 255, 704/256, 243, 233, 231

(56) References Cited

U.S. PATENT DOCUMENTS 5,956,679 A * 9/1999 Komori et al. ............. 704/256
6,026,359 A * 2/2000 Yamaguchi et al. ........ 704/256

OTHER PUBLICATIONS

Hiroki Yamamoto et al., "Fast Speech Recognition Algorithm Under Noisy Environment Using Modified CMS–PMC and Improved IDMM+SQ," 1997 IEEE, International Conference on Acoustics, Speech and Signal Processing, vol. 2, Apr. 21, 1977, pp. 847–850.

M. Shozakai et al., "A Non–Iterative Model–Adaptive E–CMN/PMC Approach for Speech Recognition in Car Environments." Eurospeech 1997, Sep. 22, 1977, pp. 287–290.

M.J.F. Gales et al., "Robust Speech Recognition in Additive and Convolutional Noise Using Parallel Model Combination," Computer Speech and Language, vol. 9, No. 4, Oct. 1, 1995, pp. 289–307.

Jenq–Neng Hwang and Chien–Jen Wang, "Joint Model and Feature Space Optimization for Robust Speech Recognition," 1997 IEEE International Conference on Acoustics, Speech and Signal Processing, vol. 2, Apr. 21, 1997, pp. 855–858.

* cited by examiner

*Primary Examiner*—Susan McFadden
*Assistant Examiner*—Huyen X. Vo
(74) *Attorney, Agent, or Firm*—Morgan, Lewis & Bockius LLP

(57) ABSTRACT

A multiplicative distortion Hm(cep) is subtracted from a voice HMM 5, a multiplicative distortion Ha(cep) of the uttered voice is subtracted from a noise HMM 6 formed by HMM, and the subtraction results Sm(cep) and {Nm(cep)–Ha (cep)} are combined with each other to thereby form a combined HMM 18 in the cepstrum domain. A cepstrum R^a(cep) obtained by subtracting the multiplicative distortion Ha (cep) from the cepstrum Ra (cep) of the uttered voice is compared with the distribution R^m(cep) of the combined HMM 18 in the cepstrum domain, and the combined HMM with the maximum likelihood is output as the voice recognition result.

3 Claims, 8 Drawing Sheets

VOICE RECOGNITION SYSTEM

BACKGROUND OF THE INVENTION

1. Field of the Invention

The present invention relates to a voice recognition system that is robust against noises and distortions in a transmission system or the like.

2. Description of the Related Art

Conventionally, in the fields of electronic apparatuses such as in-vehicle navigation systems, public attention has been drawn to a voice recognition system that enables man-machine communications and the like. The voice recognition system is well known that is structured based on an information processing algorithm as shown in FIG. 4.

In this voice recognition system, using a Hidden Markov Model (HMM), an acoustic model (voice HMM) in units of words or subwords (phonemes, syllables, etc.) is prepared. When a voice to be recognized is uttered, an observed value series which is a time series of the cepstrum of the uttered voice is generated, the observed value series is compared with the voice HMM, and the voice MM with the maximum likelihood is selected and output as the recognition result.

More specifically, a large volume of voice data Rm experimentally collected and stored in a voice database is sectioned into frame units of approximately 10 to 20 msec and a cepstrum calculation is performed successively on the data of the frame units, thereby obtaining the time series of the cepstrum. Further, the time series of the cepstrum is trained as the feature amount of the voice so that the parameter of the acoustic model (voice HMM) reflects the time series, thereby forming the voice SM in units of words or subwords.

When a voice is actually uttered, voice recognition is performed in the following manner. The data Ra of the uttered voice is input so as to be sectioned into frame units similar to the above-mentioned ones, the observed value series which is the time series of the cepstrum is generated by performing the cepstrum calculation successively on the uttered voice data of the frame units, the observed value series is compared with the voice HMM in units of words or subwords, and the voice HMM with the maximum likelihood with respect to the observed value series is output as the voice recognition result.

However, in collecting the voice data Rm for generating the voice HMM, there are cases where voice data Rm affected by a multiplicative distortion in a microphone, electric transmission system and the like are collected. It is therefore difficult to generate an accurate voice HMM. Alternatively, there cases where an uttered voice data Ra is adversely affected by an additive noise such as a room noise or a background noise when a voice to be recognized is uttered, the characteristic of spatial transfer from the mouth to the microphone, and multiplicative distortion in the microphones electric transmission system and the like. Therefore, it is an essential challenge to construct a voice recognition system that is not readily affected by the additive noise and the multiplicative distortion, that is, a robust voice recognition system.

To address this challenge, a HMM combination method has been proposed for the additive noise, and a cepstrum mean normalization (CMN) method has been proposed for the multiplicative distortion.

A voice recognition system to which HMM combination is applied has, as shown in FIG. 5, an acoustic model of a voice (voice HMM) and an acoustic model of an additive noise (noise HMM), and forms a noise added acoustic model (combined HMM) of the voice including an additive noise by combining the voice HMM and the noise HMM, compares the combined HMM with an observed value series generated based on the uttered voice data, and outputs the combined HMM with the maximum likelihood as the voice recognition result.

Here, the voice HMM is formed by sectioning the data Sm of a clean voice including no additive noise into frames, and performing the cepstrum calculation and training.

The noise HMM is formed by sectioning noise data Nm collected from a non-voice section into frames like in the case of the voice HMM, and performing the cepstrum calculation and training.

The combined HMM is formed by adding the voice HMM to the noise HMM in a linear region. However since the voice HMM and the noise HMM are expressed as distributions Sm(cep) and Nm(cep) in the cepstrum domain (cep), it is impossible to obtain the combined HMM in the cepstrum domain, Therefore, first, the distribution Sm(cep) of the voice HMM and the distribution Nm(cep) of the noise HMM are cosine-transformed to distributions Sm(log) and Nm(log) in a logarithmic spectrum domain (log), the distributions Sm(log) and Nm(log) are exponentially transformed to distributions Sm(lin) and Nm(lin) in a linear spectrum domain (lin), the distribution Nm(lin) is multiplied by a predetermined coefficient k depending on the ratio between the average power of the voice Rm in a voice database 2 and the average power of the additive noise Nm, and the SN ratio of the uttered voice Ra, and the result of the multiplication is added to the distribution Sm(lin), thereby obtaining the distribution Rm(lin)=Sm(lin)+k·Nm(lin) of the noise added voice in the linear spectrum domain. Then, the distribution Rm(lin) of the noise added voice is logarithmically transformed to a distribution Rm(log) in the logarithmic spectrum domain (log) and is inverse-cosine-transformed to obtain the distribution Rm(cep) of the noise added voice in the cepstrum domain (cep), thereby forming the combined HMM.

According to this HMM combination, since the actual uttered voice Ra is expressed as the sum Ra(lin)=Sa(lin)+Na(lin) of the clean voice Sa(lin) and the additive noise Na(lin) in the linear spectrum domain (lin) and the noise added voice model (combined HMM) is expressed as the sum Rm(lin)=Sm(lin)+k·Nm(lin) of the clean voice Sm(lin) and the additive noise k·Nm(lin) in the linear spectrum domain (lin), it is considered that the effect of the additive noise can be restrained when the observed value series Ra(cep) is compared with the distribution Rm(cep) of the combined HMM. The coefficient k is a predetermined constant.

In a voice recognition system to which CMN is applied, as shown in FIG. 6, voice data Rm including a multiplicative distortion is previously collected and stored in a voice database, and by sectioning the voice data Rm into frames and performing the cepstrum calculation and training, the voice HMM is formed. That is, when the multiplicative distortion is Hm and a clean voice including no multiplicative distortion is Sm, the voice HMM is structured as a distribution Rm(cep)=Hm(cep)+Sm(cep) in the cepstrum domain (cep).

Further, the multiplicative distortion Hm(cep) is obtained by averaging the distribution Rm(cep) of the voice HMM for a predetermined time based on the assumption that the cepstrum of the multiplicative distortion can be estimated from the long-time average of the cepstrum of the voice, and the distribution Sm(cep) of the clean voice in the cepstrum domain (cep) is generated by subtracting the multiplicative distortion Hm(cep) from the distribution Rm(cep).

When a voice is actually uttered, by sectioning the data Ra of the uttered voice into frames and performing the cepstrum calculation, the cepstrum Ra(cep)=Sa(cep)+Ha(cep) of the uttered voice in which the actual multiplicative distortion Ha is included in the clean voice Sa is obtained. Further, by averaging the cepstrum Ra(cep) of the uttered voice for a predetermined time based on the assumption that the cepstrum of the multiplicative distortion can be estimated from the long-time average of the cepstrum of the voice, the multiplicative distortion Ha(cep) is obtained. Further, by subtracting the multiplicative distortion Ha(cep) from the cepstrum Ra(cep) of the uttered voice, the cepstrum Sa(cep) of the clean voice Sa is generated. The cepstrum Sa(cep) is compared with the distribution Sm(cep) obtained from the voice HMM, and the voice HMM with the maximum likelihood is output as the recognition result.

As described above, according to CMN, since the distribution Sm(cep) in the cepstrum domain (cep) from which the multiplicative distortion Hm(cep) is removed is compared with the cepstrum Sa(cep) of the uttered voice from which the multiplicative distortion Ha(cep) is removed, it is considered that voice recognition robust against multiplicative distortions is possible.

As another voice recognition system using CMN, one having the structure shown in FIG. 7 is known. In this voice recognition system, like in the voice recognition system shown in FIG. 6, the multiplicative distortion Hm(cep) is obtained by averaging the distribution Rm(cep) of the voice HMM for a predetermined time. Further the cepstrum Ra(cep)=Sa(cep)+Ha(cep) of the uttered voice is obtained, and the multiplicative distortion Ha(cep) is obtained by averaging the cepstrum Ra(cep) of the uttered voice for a predetermined time. Further, the cepstrum Sa(cep) of the clean uttered voice is generated by subtracting the multiplicative distortion Ha(cep) from the cepstrum Ra(cep) of the uttered voice.

Here, the cepstrum Sa(cep)+Hm(cep) including the multiplicative distortion Hm(cep) is generated by adding the multiplicative distortion Hm(cep) obtained from the distribution Rm(cep) of the voice HMM to the cepstrum Sa(cep) of the clean uttered voice, the distribution Rm(cep)=Hm(cep)+Sm(cep) of the voice HMM is compared with the cepstrum Sa(cep)+Hm(cep), and the voice HMM with the maximum likelihood is output as the recognition result.

Therefore, in the voice recognition system shown in FIG. 7, like in the voice recognition system shown in FIG. 6, it is considered that voice recognition robust against multiplicative distortions is possible by performing a processing based on the assumption that the cepstrum of the multiplicative distortion can be estimated from the long-time average of the cepstrum of the voice.

Moreover, a voice recognition system is known that is provided with expandability by using both HMM combination and CMN as shown in FIG. 8.

In this voice recognition system, like in the system shown in FIG. 5, an acoustic model of a voice (voice HMM) and an acoustic model of a noise (noise HMM) are formed, and the multiplicative distortion Hm(cep) obtained by averaging the distribution Rm(cep) of the voice HMM in the cepstrum domain (cep) for a predetermined time is subtracted from the distribution Rm(cep) there by obtaining the distribution Sm(cep) of the voice excluding the multiplicative distortion.

Then, the distribution Sm(cep) of the clean voice in the cepstrum domain and the distribution Nm(cep) of the noise HMM in the cepstrum domain are cosine-transformed to obtain distributions Sm(log) and Nm(log) in the logarithmic spectrum domain, the distributions Sm(log) and Nm(log) are exponentially transformed to obtain distributions Sm(lin) and Nm(lin) in the linear spectrum domain (lin), the distribution Nm(lin) is multiplied by a predetermined coefficient k depending on the SN ratio, and the result of the multiplication is added to the distribution Sm(lin), thereby obtaining the distribution R'm(lin)=Sm(lin)+k·Nm(lin) of the noise added voice.

Then, the distribution K'm(lin) of the noise added voice is logarithmically transformed to a distribution R'm(log) in the logarithmic spectrum domain (log) and is inverse-cosine-transformed to obtain the distribution R'm(cep) of the noise added voice in the cepstrum domain (cep), thereby forming the combined HMM.

That is, the combined HMM is structured as the cepstrum of the noise added voice generated by removing the multiplicative distortion Hm from the voice Rm and adding the additive noise Nm to the voice from which the multiplicative distortion Hm is removed.

When a voice is actually uttered, by sectioning the data Ra of the uttered voice into frames and performing the cepstrum calculation, the cepstrum Ra(cep)=Ha(cep)+R^a(cep) of the uttered voice in which the actual multiplicative distortion Ha and the additive noise Na are included in the clean voice Sa is obtained. Then, by averaging the cepstrum Ra(cep) for a predetermined time, the multiplicative distortion Ha(cep) is obtained, and by subtracting the multiplicative distortion Ha(cep) from the cepstrum Ra(cep) of the uttered voice, the cepstrum R^a(cep) of the uttered voice excluding the multiplicative distortion Ha(cep) is generated. That is, the cepstrum R^a(cep) is the cepstrum of the uttered voice including the additive noise Na and from which the multiplicative distortion Ha is removed.

Then, the cepstrum R^a(cep) is compared with the distribution Rm(cep) of the combined HMM, and the combined HMM with the maximum likelihood is output as the recognition result.

However, in the voice recognition system shown in FIG. 8 to which CMN and HMM combinations are applied, although voice recognition is performed by comparing the combined HMM with the cepstrum R^a(cep) of the uttered voice, the combined HMM is not modeled as an appropriate object of comparison with the uttered voice.

That is, when the actually uttered voice Ra includes the multiplicative distortion Ha and the additive noise Na, the uttered voice Ra can be expressed, as the clean uttered voice Sa on which the multiplicative distortion Ha and the additive noise Na are superimposed, as shown by the following equation (1) in a linear spectrum domain (lin):

$$Ra(lin) = Ha(lin)Sa(lin) + Na(lin) \qquad (1)$$
$$= Ha(lin)\{Sa(lin) + Na(lin)/Ha(lin)\}$$
$$= Ha(lin)R^\wedge a(lin)$$

In the voice recognition system shown in FIG. 8, by sectioning the uttered voice Ra expressed as the linear spectrum domain (lin) into frames and performing the cepstrum calculation, the cepstrum Ra(cep) of the uttered voice Ra as shown by the following equation (2) is obtained:

$$Ra(cep)=Ha(cep)+R^\wedge a(cep) \qquad (2)$$

Then, by removing the multiplicative distortion Ha(cep) in the cepstrum domain (cep) by CMN, the cepstrum R^a (cep) to be compared with is obtained. The cepstrum R^a (cep) corresponds to the linear spectrum {Sa(lin)+Na(lin)/Ha(lin)} in the equation (1).

On the contrary, the combined HMM is generated based on the noise added voice as explained with reference to FIG. 8. The following equation (3) represents the noise added voice expressed in the linear spectrum domain (lin), and the following equation (4) represents the combined HMM expressed in the cepstrum domain (cep):

$$R'm(\text{lin}) = Sm(\text{lin}) + k \cdot Nm(\text{lin}) \quad (3)$$

$$R'm(cep) = IDCT[\log\{R'm(lin)\}] \quad (4)$$

$$= cep[R'm(lin)]$$

The operator log represents logarithmic transformation, the operator IDCT represents inverse cosine transformation, and the operator cep represents the inverse cosine transformation of the logarithmic transformation, that is, IDCT[log{ }].

Contrasting the equation (2) with the equation (4), since the cepstrum R^a(cep) generated based on the uttered voice Ra shown in the equation (2) corresponds to the linear spectrum {Sa(lin)+Na(lin)/Ha(lin)} in the equation (1), a component which is the quotient when the additive noise Na(lin) is divided by the multiplicative distortion Ha(lin) is included, whereas since the cepstrum R'm(cep) of the combined HMM shown in the equation (4) corresponds to the linear spectrum Sm(lin)+k·Nm(lin) shown in the equation (3), it is not performed to divide the additive noise Nm(lin) by some multiplicative distortion.

Thus, the combined HMM is not appropriately modeled as an object of comparison for recognizing the actual uttered voice.

SUMMARY OF THE INVENTION

An object of the present invention is to provide a voice recognition system that overcomes the above-mentioned conventional problem and is robust against additive noises and multiplicative distortions.

To achieve the above-mentioned object, according to the present invention, a voice recognition system that performs voice recognition by comparing an uttered voice including a multiplicative distortion and an additive noise with a combined model obtained by combining a noise model with an acoustic model formed based on a voice including at least a multiplicative distortion, is characterized by comprising: a first extracting section for extracting a feature component of the multiplicative distortion included in the uttered voice; a second extracting section for extracting a feature component of a multiplicative distortion included in the acoustic model; a first calculating section for combining the uttered voice with the feature component of the multiplicative distortion extracted by the first extracting section; a second calculating section for combining the acoustic model with the feature component of the multiplicative distortion extracted by the second extracting section; a third calculating section for combining the noise model with the feature component of the multiplicative distortion extracted by the first extracting section; and a forming section for forming the combined model by combining a result of the calculation by the second calculating section with a result of the calculation by the third calculating section, and in that voice recognition is performed by comparing a result of the calculation by the first calculating section with the combined model.

According to the voice recognition system having this structure, the second calculating section outputs a calculation result which is the acoustic model combined with the multiplicative distortion, and the third calculating section outputs a calculation result which is the noise model combined with the multiplicative distortion. By the forming section combining the results of the calculations by the second and the third calculating section with each other, the combined model including information on the acoustic model, the noise model and the multiplicative distortion is formed.

The first calculating section combines the uttered voice including the multiplicative distortion and the additive noise with the multiplicative distortion extracted by the first extracting section to thereby output a calculation result having information on the uttered voice corresponding to the acoustic model which the combined model has, the additive noise corresponding to the noise model and the multiplicative distortion corresponding to the multiplicative distortion in the combined model.

The result of the calculation by the first calculating section and the combined model have common information, and by comparing the result of the calculation by the first calculating section with the combined model, voice recognition that is appropriate and robust against the additive noise and the multiplicative distortion is realized, Moreover, to achieve the above-mentioned object, according to the present invention, a voice recognition system that performs voice recognition by comparing an uttered voice including a multiplicative distortion and an additive noise with a combined model obtained by combining a noise model with an acoustic model formed based on a voice including at least a multiplicative distortion, is characterized by comprising; a first extracting section for extracting a feature component of the multiplicative distortion included in the uttered voice; a second extracting section for extracting a feature component of a multiplicative distortion included in the acoustic model; a first calculating section for combining the uttered voice with the feature component of the multiplicative distortion extracted by the first extracting section; a second calculating section for combining the noise model with the feature component of the multiplicative distortion extracted by the first extracting section and with the feature component of the multiplicative distortion extracted by the second extracting section; a forming section for forming the combined model by combining the acoustic model with a result of the calculation by the second calculating section; and a third calculating section for combining the combined model with the feature component of the multiplicative distortion extracted by the second extracting section, and in that voice recognition is performed by comparing a result of the calculation by the first calculating section with a result of the calculation by the third calculating section.

According to the voice recognition system having this structure, the second calculating section combines the noise model with the multiplicative distortion extracted by the first extracting section and with the multiplicative distortion extracted by the second extracting section. By the forming section combining the result of the calculation by the second calculating section with the acoustic model, the combined model having information on the acoustic model, the noise model and the multiplicative distortion is formed, and further, the third calculating section combines the multiplicative distortion extracted by the second extracting section with the combined model and outputs the calculation result.

The first calculating section combines the uttered voice including the multiplicative distortion and the additive noise with the multiplicative distortion extracted by the first extracting section to thereby output a calculation result having information on the uttered voice corresponding to the acoustic model which the combined model has, the additive noise corresponding to the noise model and the multiplicative distortion corresponding to the multiplicative distortion in the combined model.

The result of the calculation by the first calculating section and the result of the calculation by the third calculating section have common information, and by comparing the results of the calculations with each other, voice recognition that is appropriate and robust against the additive noise and the multiplicative distortion is realized.

Moreover, to achieve the above-mentioned object, according to the present invention, a voice recognition system that performs voice recognition by comparing an uttered voice including a multiplicative distortion and an additive noise with a combined model obtained by combining a noise model with an acoustic model formed based on a voice including at least a multiplicative distortion, is characterized by comprising: a first extracting section for extracting a feature component of the multiplicative distortion included in the uttered voice; a second extracting section for extracting a feature component of a multiplicative distortion included in the acoustic model; a first calculating section for combining the uttered voice with the feature component of the multiplicative distortion extracted by the first extracting section and combining the uttered voice with the feature component of the multiplicative distortion In extracted by the second extracting section; a second calculating section for combining the noise model with the feature component of the multiplicative distortion extracted by the first extracting section and combining the noise model with the feature component of the multiplicative distortion extracted by the second extracting section; and a forming section for forming the combined model by combining the acoustic model with a result of the calculation by the second calculating section, and in that voice recognition is performed by comparing the result of the calculation by the first calculating section with the combined model.

According to the voice recognition system having this structure, the second calculating section combines the noise model with the multiplicative distortion extracted by the first extracting section and with the multiplicative distortion extracted by the second extracting section. By the forming section combining the result of the calculation by the second calculating section with the acoustic model, the Combined model having information on the acoustic model, the noise model and the multiplicative distortion is formed.

The first calculating section combines the uttered voice including the multiplicative distortion and the additive noise with the multiplicative distortion extracted by the first extracting section and with the multiplicative distortion extracted by the second extracting section to thereby output a calculating result having information on the uttered voice corresponding to the acoustic model which the combined model has, the additive noise corresponding to the noise model and the multiplicative distortion corresponding to the multiplicative distortion in the combined model.

The result of the calculation by the first calculating section and the combined model have common information, and by comparing the result of the calculation by the first calculating section with the combined model, voice recognition that is appropriate and robust against the additive noise and the multiplicative distortion is realized.

DETAILED DESCRIPTION OF THE PRESENT INVENTION

Figure 1:
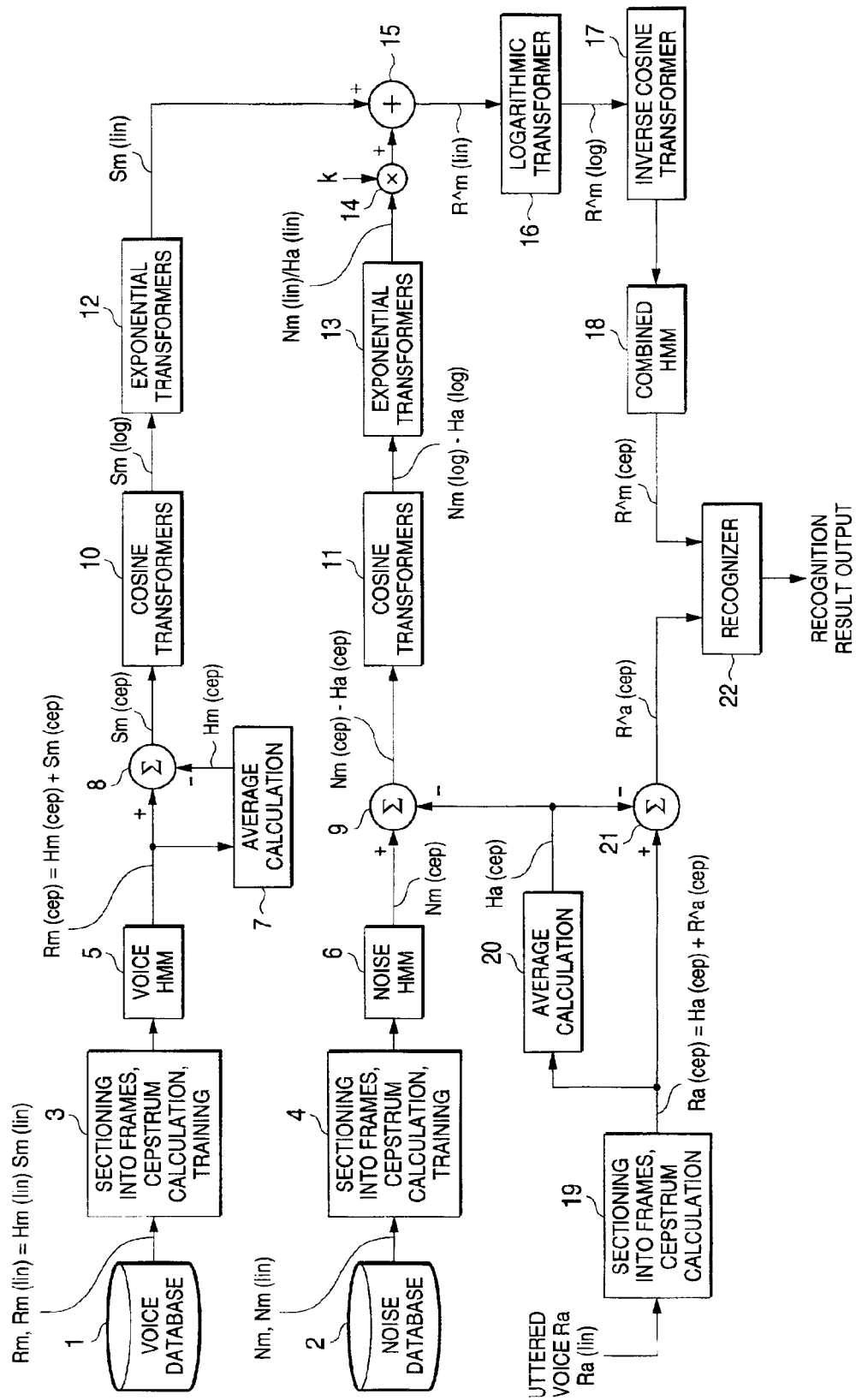
FIG. 1 is a block diagram showing the structure of the voice recognition system of the first embodiment.
Figure 2:
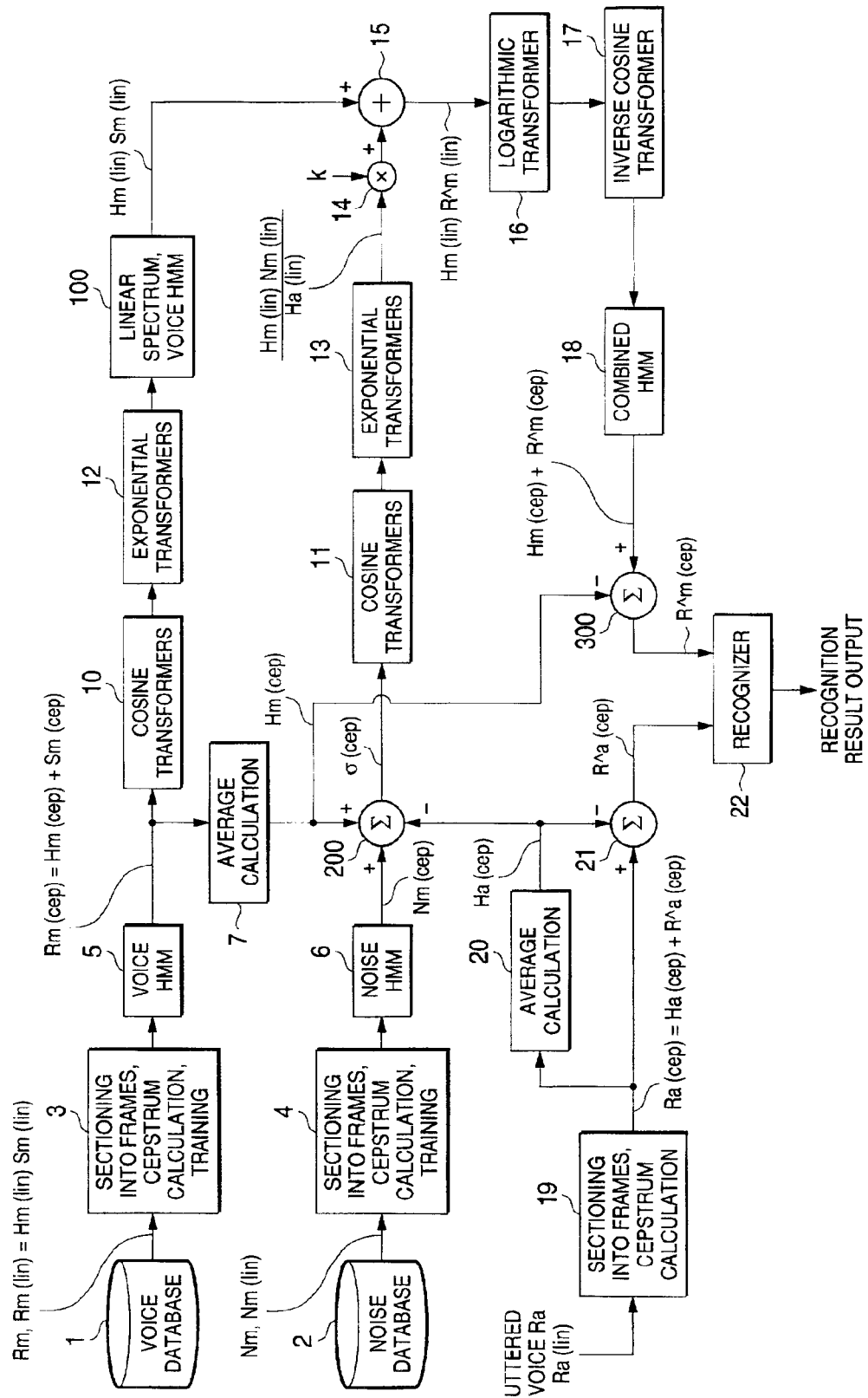
FIG. 2 is a block diagram showing the structure of the voice recognition system of the second embodiment.
Figure 3:
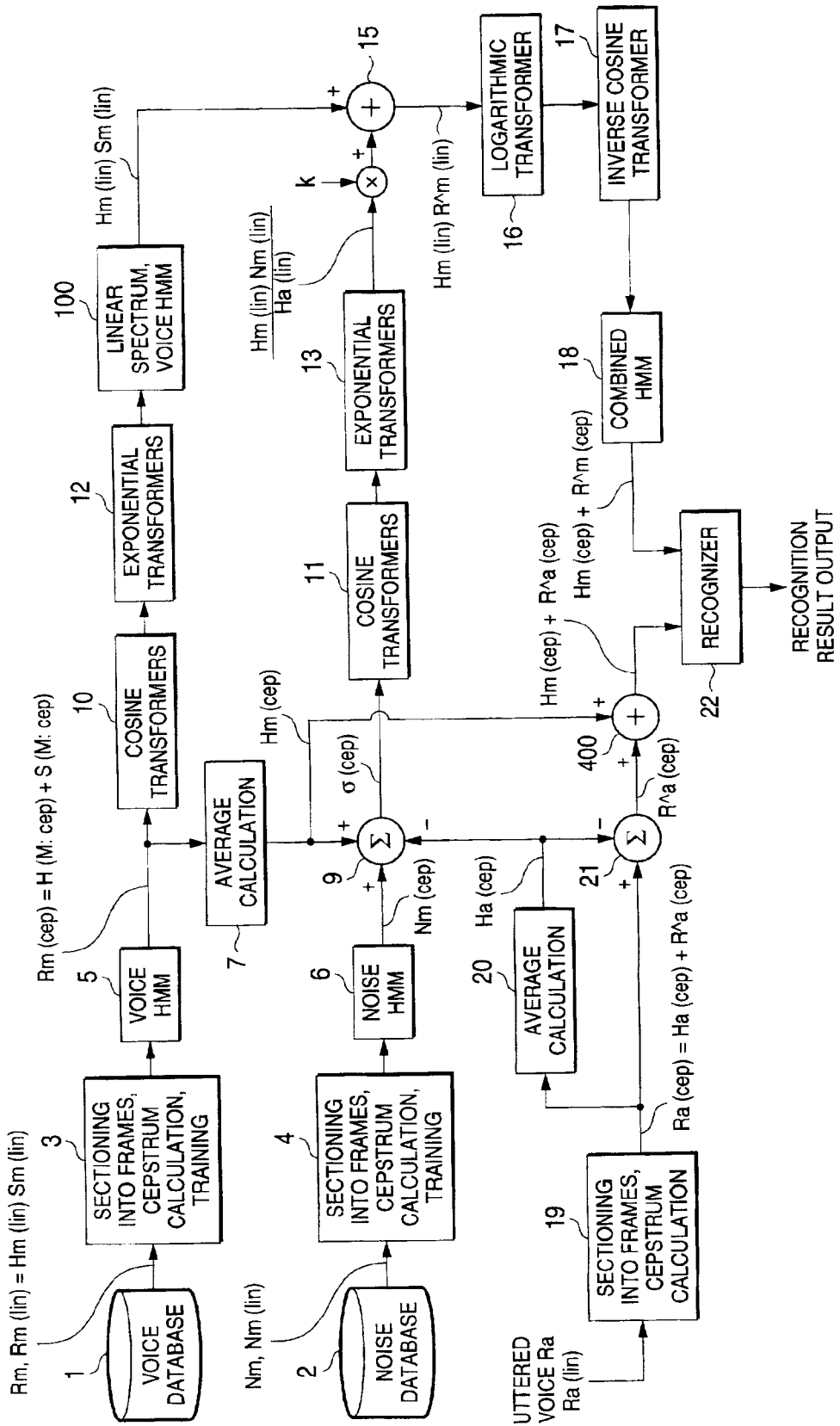
FIG. 3 is a block diagram showing the structure of the voice recognition system of the third embodiment.
Figure 4:
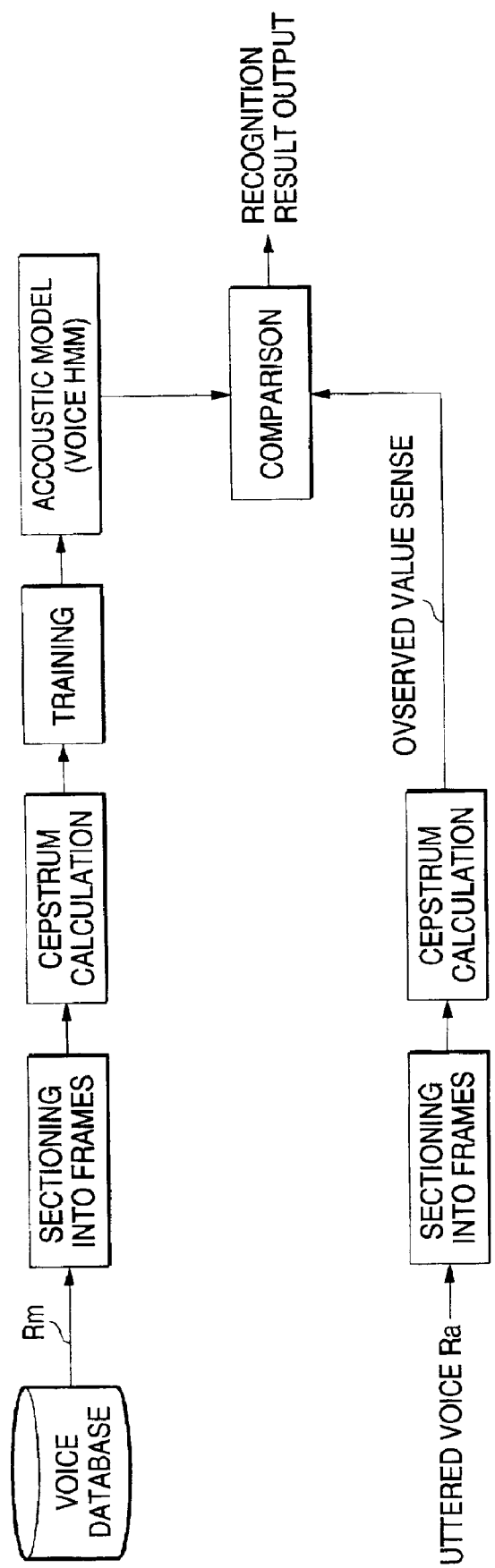
FIG. 4 is a block diagram showing the structure of the conventional voice recognition system.
Figure 5:
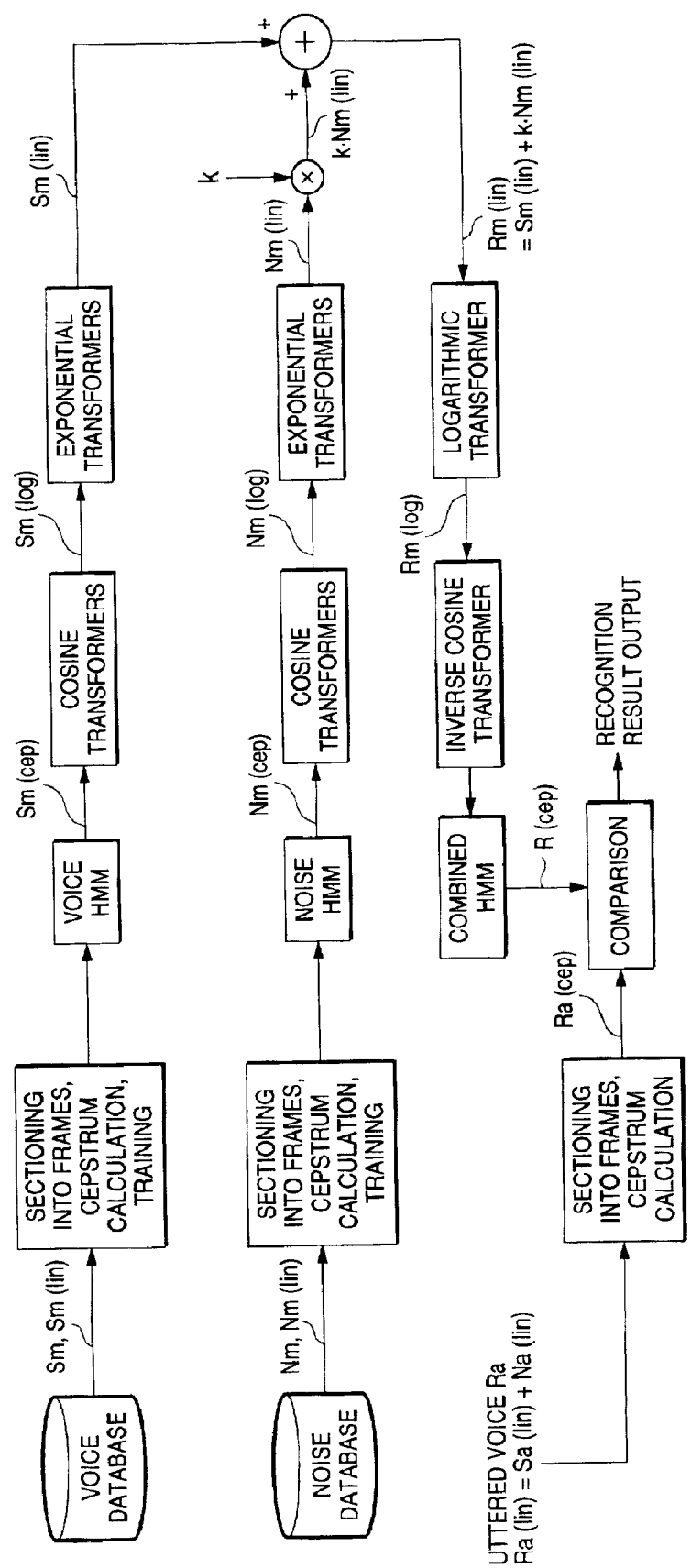
FIG. 5 is a block diagram showing the structure of the conventional recognition system to which the HMM combination is applied.
Figure 6:
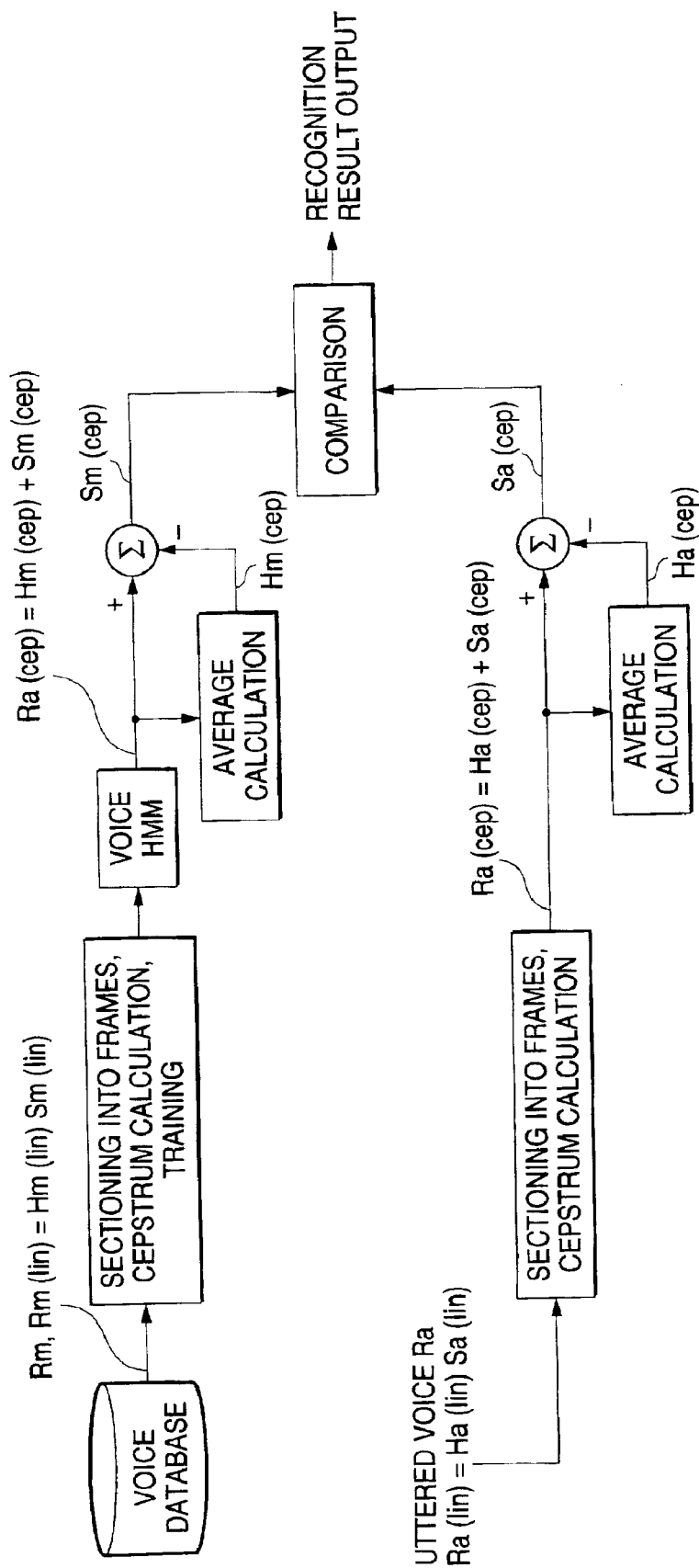
FIG. 6 is a block diagram showing the structure of the conventional voice recognition system to which the CMN is applied.
Figure 7:
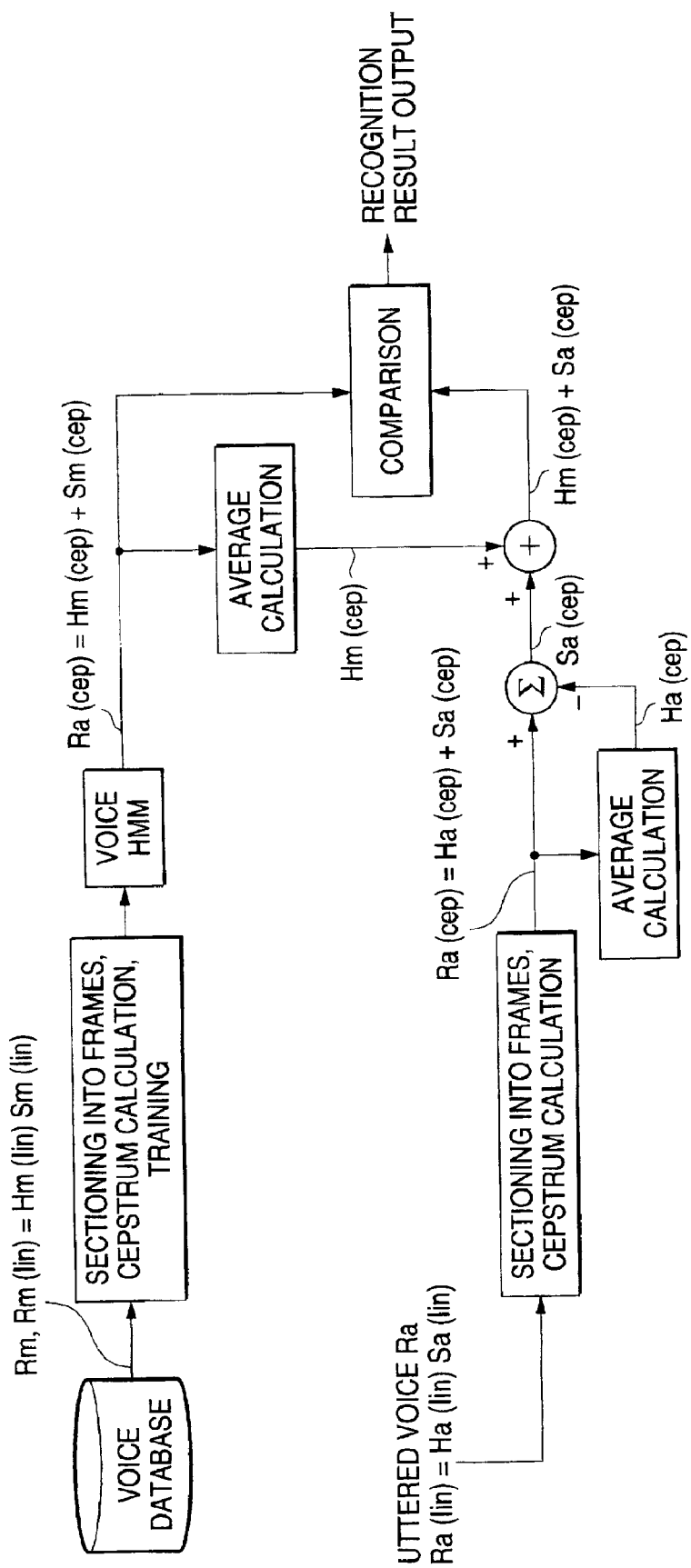
FIG. 7 is a block diagram showing the structure of another conventional voice recognition system to which the CMN is applied.
Figure 8:
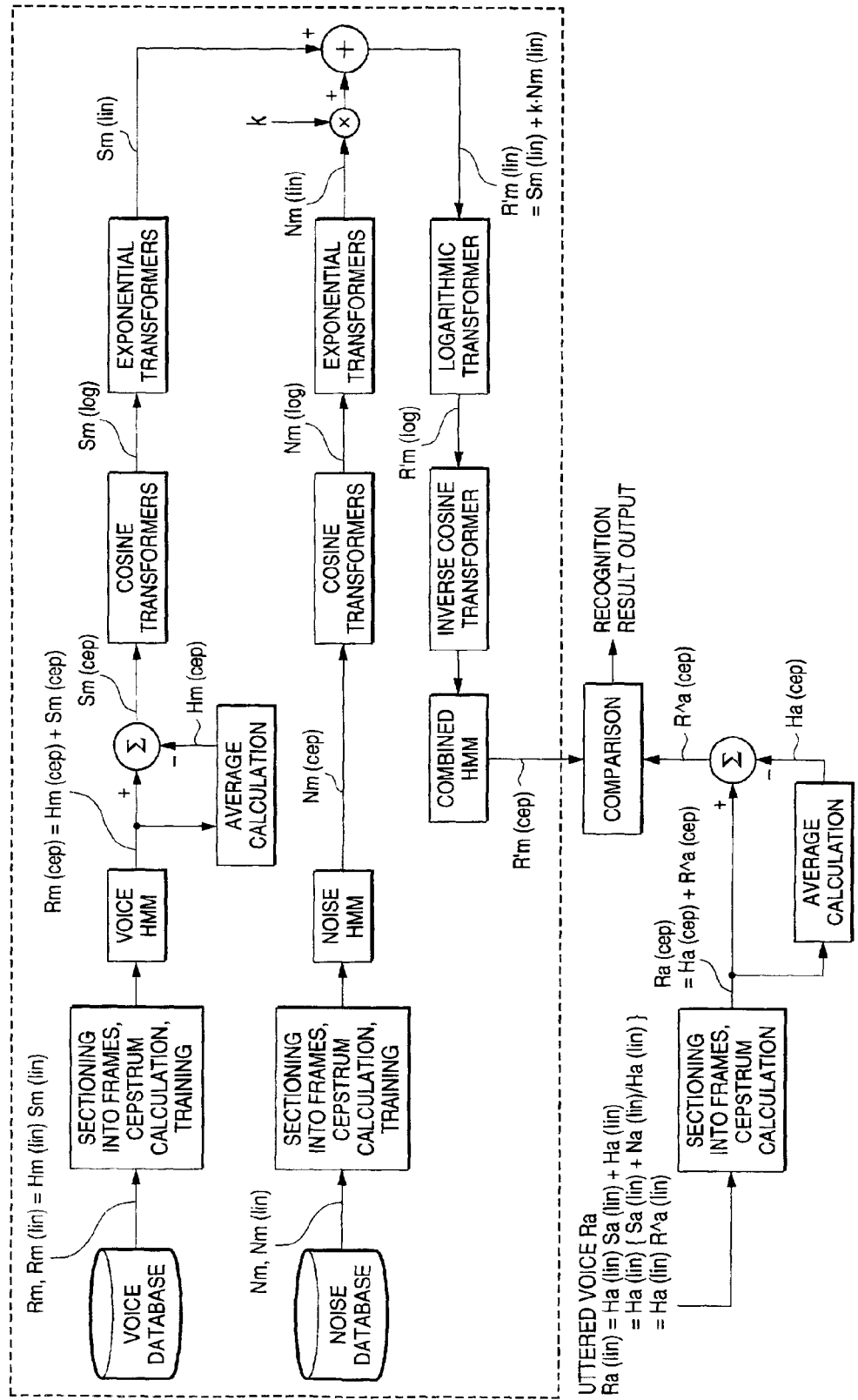
FIG. 8 is a block diagram showing the structure of the conventional voice recognition system to which the CMN and HMM combination is applied.

Hereinafter, embodiments of the present invention will be described with reference to the drawings. FIG. 1 is a block diagram showing the structure of a first embodiment of the voice recognition system of the present invention. FIG. 2 is a block diagram showing the structure of a second embodiment. FIG. 3 is a block diagram showing the structure of a third embodiment.

Before describing the first through the third embodiments, reference designations will be explained. The voice data used for the voice recognition system to generate the acoustic model (voice HMM) is denoted by Rm, the additive noise used for the voice recognition system to generate the noise model (noise HMM) is denoted by Nm, and the data of the actually uttered voice is denoted by Ra. The voice data Rm is represented as the clean voice Sm including no noise and on which the multiplicative distortion HMM is superimposed. The uttered voice Ra is represented as the clean uttered voice Sm including no noise and on which the multiplicative distortion Ha and the additive noise Na are superimposed.

The information in the linear spectrum domain, the information in the logarithmic spectrum domain and the information in the cepstrum domain are marked with (lin), (log) and (cep), respectively. For example, the linear spectrum of the voice data Rm used for generating the acoustic model (voice HMM) is shown as Rm(lin)=Hm(lin)Sm(lin).

First Embodiment

In FIG. 1, the voice recognition system of the first embodiment is provided with a voice database 1 in which a large volume of experimentally collected voice data Rm is stored, and a noise database 2 in which experimentally collected data Nm of the additive noise is stored.

The voice data Rm is collected by a general method such as collecting the voice uttered by speakers in a silent environment with a microphone and A/D converting it at a predetermined sampling frequency. Therefore, the voice data Rm, although hardly including any additive noise, can include the multiplicative distortion Hm due to the microphone, the electric transmission system and the like.

The additive noise data Nm is generated based on the noise collected from a non-voice sections in the input signal containing the voice to be recognized.

Further, the voice recognition system is provided with an acoustic model of voice (voice HMM) 5 and an acoustic model of a noise (noise HMM) 6 formed by use of the Hidden MarkovModel Here, a signal processor 3 obtains the time series of the cepstrum by inputting the voice data Rm in the voice database 1 so that it is sectioned into frame units of approximately 10 to 20 msec and performing the cepstrum calculation successively on the data of the frame units, and forms the voice HMM 5 in units of words or subwords by training the time series of the cepstrum as the feature amount of the voice.

Moreover, a signal processor 4 obtains the time series of the cepstrum by inputting the data Nm of the additive noise in the noise database 2 so that it is sectioned into frame units like the voice data Rm and performing the cepstrum calculation successively on the data of the frame units, and forms the noise HMM 6 by training the time series of the cepstrum as the feature amount of the additive noise.

To the voice HMM 5 and the noise HMM 6 thus formed, the following are connected in a predetermined relationship as shown in the figure: an average calculator 7; subtracters 8 and 9; cosine transformers 10 and 11; exponential transformers 12 and 13; a multiplier 14; and an adder 15. Further, to the output of the adder 15, the following are connected in series: a logarithmic transformer 16, an inverse cosine transformer 17; and a combined HMM 18 which is the acoustic model of the noise added voice. The distribution R^m(cep) of the combined HMM 18 in the cepstrum domain (cep) is supplied to a recognizer 22.

When a voice is actually uttered, the uttered voice is transfomed to digital uttered voice data Ra by a general method such as collecting the uttered voice by a microphone (not shown) and A/D converting it at a predetermined sampling frequency, and the data Ra is input to a signal processor 19.

Consequently, the data Ra of the uttered voice includes the multiplicative distortion Ha due to the microphone, the electric transmission system and the like, and the additive noise Na such as a background noise or a room noise (for example, a noise caused in the passenger compartment of a car).

Then, the signal processor 19 obtains the time series Ra(cep) of the cepstrum by inputting the data Ra of the uttered voice so that it is sectioned into frame units of approximately 10 to 20 msec and performing the cepstrum calculation successively on the data of the frame units, and outputs the obtained time series Ra(cep).

Further, an average calculator 20 and a Subtracter 21 are provided in succession to the signal processor 19. The observed value series R^a(cep) output by the subtracter 21 is supplied to the recognizer 22.

The average calculator 7 averages the distribution Rm(cep) of the voice HMM 5 in the cepstrum domain (cep) for a predetermined time to thereby obtain the multiplicative distortion Hm(cep) included in the distribution Rm(cep), and the subtracter 8 subtracts the multiplicative distortion Hm(cep) obtained by the average calculator 7 from the distribution Rm(cep) to thereby generate the distribution Sm(cep), in the cepstrum domain (cep), of the clean voice from which the multiplicative distortion is removed.

The cosine transformer 10 cosine-transforms the distribution Sm(cep) to the distribution Sm(log) in the logarithmic spectrum domain (lin) The exponential transformer 12 exponentially transforms the distribution Sm(log) to obtain the distribution Sm(lin) in the linear spectrum domain (lin).

The subtracter 9 subtracts the multiplicative distortion Ha(cep) obtained by the average calculator 20 from the distribution Nm(cep) of the noise HMM in the cepstrum domain (cep). That is, the average calculator 20 obtains the multiplicative distortion Ha(cep) by averaging for a predetermined time (corresponding to a predetermined number of frames) the cepstrum Ra(cep) of the uttered voice data Ra of each frame unit output from the signal processor 19 when a voice is actually uttered, and causes the above-mentioned subtraction to be performed by supplying the multiplicative distortion Ha(cep) to the subtracter 9.

The cosine transformer 11 cosine-transforms the subtraction result Nm(cep)−Ha(cep) by the subtracter 9 to thereby obtain the subtraction result Nm(log)−Ha(log) in the logarithmic spectrum domain (log). The exponential transformer 13 exponentially transforms the subtraction result Nm(log)−Ha(log) to thereby obtain the division result Nm(lin)/Ha(lin) in the linear spectrum domain (lin).

By the multiplier 14 multiplying the division result Nm(lin)/Ha(lin) by the coefficient k of a predetermined value depending on the ratio between the average power of the voice Rm in the voice database 2 and the average power of the additive noise Nm and the SN ratio of the uttered voice Ra and supplying the result of the multiplication to the adder 15, the adder 15 adds the output k·{Nm(lin)/Ha(lin)} of the multiplier 14 to the output Sm(lin) of the exponential transformer 12, so that an addition result R^m(lin) in the linear spectrum domain is generated.

The addition result R^m(lin) is, as shown by the following equation (5), the linear spectrum of the noise added voice R^m obtained by superimposing the additive noise Nm and the multiplicative distortion Ha on the voice Sm from which the multiplicative distortion Hm is removed:

$$R\hat{}m(\text{lin}) = Sm(\text{lin}) + k \cdot \{Nm(\text{lin})/Ha(\text{lin})\} \tag{5}$$

The logarithmic transformer 16 obtains the logarithmic spectrum R^m(log) of the noise added voice by logarithmically transforming the linear spectrum R^m(lin) of the noise added voice generated by adder 15, and the inverse cosine transformer 17 obtains the cepstrum R^m(cep) of the noise added voice by inverse-cosine-transforming the logarithmic spectrum R^m(log), thereby forming the combined HMM 18 which is the acoustic model (acoustic model in the cepstrum domain) of the noise added voice. Then, the distribution R^m(cep) of the combined HMM 18 in the cepstrum domain is supplied to the recognizer 22 in units of words or subwords.

The subtracter 21 is input to the multiplicative distortion Ha(cep) in the cepstrum domain (cep) output from the average calculator 20 and the uttered voice Ra(cep) in the cepstrum domain (cep) output in units of frames from the signal processor 19, generates the time series of the uttered voice R^a(cep) in the cepstrum domain (cep) from which the multiplicative distortion is removed, that is, the observed value series R^a(cep) by subtracting the multiplicative distortion Ha(cep) from the uttered voice Ra (cep) as shown by the following equation (6), and supplies the observed value series R^a(cep) to the recognizer 22:

$$R\hat{}a(\text{cep}) = Ra(\text{cep}) - Ha(\text{cep}) \tag{6}$$

The recognizer 22 compares the observed value series R^a(cep) with the distribution R^m(cep) of the combined HMM 18 in the cepstrum domain, and outputs the HMM with the maximum likelihood as the voice recognition result.

In the voice recognition system of this embodiment having this structure, since the subtracter 9 is provided and the average value (that is, the multiplicative distortion) Ha(cep) of the uttered voice Ra in the cepstrum domain (cep) is subtracted from the distribution Nm(cep) of the noise HMM 6 in the cepstrum domain (cep), as shown by the second term on the right side of the equation (5), the linear spectrum R^m(lin) of the noise added voice includes a component which is the quotient when the additive noise Nm (lin) is divided by the multiplicative distortion Ha (lin), and the combined HMM 18 including this component is modeled.

Since the actually uttered voice Ra is expressed in the linear spectrum domain (lin) as Ra(lin)=Ha(lin){Sa(lin)+Na(lin)/Ha(lin)}=Ha(lin)R^a(lin), the observed value series R^a (cep) expressed as the equation (6) is R^a(lin)=Sa(lin)+Na(lin)/Ha(lin) in the linear spectrum domain, and like the linear spectrum R^m(lin) of the noise added voice, a component which is the quotient when the additive noise Na(lin) is divided by the multiplicative distortion Ha(lin) is included. Consequently, the combined HMM 18 is appropriately modeled as an object of comparison for recognizing the uttered voice.

As described above, according to the voice recognition system of this embodiment, since the combined HMM 18 used for voice recognition can be appropriately modeled and the structure handling the additive noise and the multiplicative distortion is employed, the voice recognition system is robust against the additive noise and the multiplicative distortion and the success rate in voice recognition can be improved.

Second Embodiment

Next, a voice recognition system of a second embodiment will be described with reference to FIG. 2. in FIG. 2, parts the same as and corresponding to those of FIG. 1 are denoted by the same reference designations.

In FIG. 2, mentioning differences from the first embodiment, in the voice recognition system of this embodiment, when the average calculator 7 obtains the cepstrum Hm(cep) of the multiplicative distortion by averaging the distribution Rm(cep) of the voice HMM 5 in the cepstrum domain (cep) for a predetermined time, the cepstrum Hm(cep) is supplied to an adder-subtracter 200. Moreover, to the cosine transformer 10, the distribution Rm(cep) of the voice HMM 5 in the cepstrum domain (cep) is supplied as it is, and the output of the exponential transformer 12 is supplied to the adder 15 through a linear spectrum voice HMM 100.

The adder-subtracter 200 is supplied with the cepstrum Hm(cep) of the multiplicative distortion, the distribution Nm(cep) of the noise HMM 6 in the cepstrum domain (cep) and the cepstrum Ha(cep) of the multiplicative distortion from the average calculator 20, and obtains an addition and subtraction result σ(cep) as shown by the following equation (7):

$$\sigma(cep) = Hm(cep) + Nm(cep) - Ha(cep) \quad (7)$$

Moreover, a subtracter 300 is provided, the cepstrum Hm(cep) of the multiplicative distortion of the average calculator 7 is subtracted from the distribution Hm(cep)+R^m(cep) of the combined HMM 18 in the cepstrum domain (cep), and the result of the subtraction is supplied to the recognizer 22.

In the voice recognition system having this structure, the distribution Rm(cep) of the voice HMM 5 in the cepstrum domain (cep) is cosine-transformed by the cosine transformer 10 and is exponentially transformed by the exponential transformer 12 to thereby obtain the distribution Rm(lin)=Hm(lin)Sm(lin) in the linear spectrum domain, whereby the voice HMM 100 is obtained.

Further, the distribution Rm(lin)=m (lin)Sm(lin) of the voice HMM 100 in the linear spectrum domain is supplied to the adder 15.

The addition and subtraction result σ (cep) in the cepstrum domain (cep) output from the adder-subtracter 200 is transformed to the multiplication and division result Hm(lin) Nm(lin)/Ha(lin) in the linear spectrum domain (lin) by being cosine-transformed by the cosine transformer 11 and exponentially transformed by the exponential transformer 13, and is multiplied by the predetermined coefficient k by the multiplier 14 to k·{Hm(lin) Nm(lin)/Ha(lin)} which is supplied to the adder 15.

Consequently, at the adder 15, as expressed as the following equation (8), the addition result becomes the linear spectrum Hm(lin) R^m(lin) of the noise added voice obtained by superimposing the multiplicative distortions Hm and Ha and the additive noise Nm on the voice Rm:

$$Hm(lin)R^\wedge m(lin) = Hm(lin)Sm(lin) + \quad (8)$$
$$k \cdot \{Hm(lin)Nm(lin)/Ha(lin)\}$$
$$= Hm(lin)\{Sm(lin) + k \cdot Nm(lin)/Ha(lin)\}$$

The linear spectrum Hm(lin)R^m(lin) of the noise added voice is logarithmically transformed by the logarithmic transformer 16 and is inverse-cosine-transformed by the inverse cosine transformer 18 to thereby obtain the cepstrum Hm(cep)+R^m(cep) of the noise added voice, whereby the combined HMM 18 is formed which is the acoustic model (acoustic model in the cepstrum domain) of the noise added voice.

Then, by the subtracter 300 subtracting the cepstrum Hm(cep) of the multiplicative distortion obtained by the average calculator 7 from the distribution Hm(cep)+R^m (cep) of the combined HMM 18 in the cepstrum domain, the cepstrum R^m(cep) of the noise added voice from which the multiplicative distortion Hm is removed is supplied to the recognizer 22.

As described above, according to the voice recognition system of this embodiment, at the recognizer 22, the cepstrum R^m(cep) of the noise added voice is compared with the cepstrum R^a(cep) of the uttered voice.

Since the cepstrum R^m(cep) of the noise added voice includes a component corresponding to the linear spectrum k·Nm(lin)/Ha(lin) shown in the equation (8) and the cepstrum R^a(cep) of the uttered voice includes a component corresponding to the linear spectrum Na(lin)/Ha(lin), the combined HMM 18 is appropriately modeled as an object of comparison for recognizing the uttered voice.

As described above, according to the voice recognition system of this embodiment, since the combined HMM 18 used for voice recognition can be appropriately modeled and the structure handling the additive noise and the multiplicative distortion is employed, the voice recognition system is robust against the additive noise and the multiplicative distortion and the success rate in voice recognition can be improved.

Third Embodiment

Next, a voice recognition system of a third embodiment will be described with reference to FIG. 3. In FIG. 3, parts the same as and corresponding to those of FIG. 2 are denoted by the same reference designations.

Mentioning differences between this embodiment shown in FIG. 3 and the second embodiment shown in FIG. 2, in the voice recognition system of the second embodiment, the cepstrum Hm(cep) of the multiplicative distortion obtained by the average calculator 7 is supplied to the subtracter 300, and the subtracter 300 subtracts the cepstrum Hm(cep) of the multiplicative distortion from the distribution Hm(cep)+R^m(cep) of the combined HMM 18 in the cepstrum domain (cep) and supplies the result of the subtraction to the recognizer 22. Further, the cepstrum R^a(cep) of the uttered voice obtained by the subtracter 21 is supplied to the recognizer 22, and the recognizer 22 compares the cepstrum R^a(cep) of the uttered voice with the cepstrum R^m(cep) from the subtracter 300 to perform voice recognition.

On the contrary, in the voice recognition system of this embodiment, as shown in FIG. 3, an adder 400 is provided between the subtracter 21 and the recognizer 22, and the addition result Hm(cep)+R^a(cep) in the cepstrum domain (cep) obtained by adding the cepstrum Hm(cep) of the multiplicative distortion obtained by the average calculator 7 to the cepstrum R^a(cep) of the uttered voice from the subtracter 21 is supplied to the recognizer 22, Further, the subtracter 300 shown in FIG. 2 is not provided in this voice recognition system, the distribution Hm(cep)+R^m(cep) of the combined HMM 18 in the cepstrum domain (cep) is supplied to the recognizer 22, and the recognizer 22 compares the addition result Hm(cep)+R^a(cep) with the distribution Hm(cep)+R^m(cep) to perform voice recognition.

Here, since the linear spectrum Ra(lin) of the uttered voice Ra is expressed as Ra(lin)=Ha(lin)Sa(lin)+Na(lin)=Ha(lin){Sa(lin)+Na(lin)/Ha(lin)}=Ha(lin)R^a(lin) as shown by the equation (1), the subtracter 21 outputs the cepstrum R^a(cep) corresponding to the linear spectrum {Sa(lin)+Na(lin)/Ha(lin)}, and the adder 400 generates the cepstrum Hm(cep)+R^a(cep) corresponding to a linear spectrum Hm(lin){Sa(lin)+Na(lin)/Ha(lin)} and supplies it to the recognizer 22.

On the other hand, the recognizer 22 is supplied from the combined HMM18 with a cepstrum Hm(cep)+R^m(cep) corresponding to the linear spectrum Hm(lin)R^m(lin)=Hm(lin)Sm(lin)+K {Hm(lin)Nm(lin)/Ha(lin)}=Hm(lin){Sm(lin)+k·Nm(lin)/Ha(lin)} of the noise added voice as shown by the equation (8).

As described above, according to the voice recognition system of this embodiment, since the recognizer 22 compares the cepstrum Hm(cep)+R^a(cep) including a component expressed as a linear spectrum {k·Na(lin)/Ha(lin)} with the cepstrum Hm(cep)+R^m(cep) including a component expressed as the linear spectrum {k·Nm(lin)/Ha(lin)}, the success rate in voice recognition can be improved, and a voice recognition system robust against the additive noise and the multiplicative distortion can be realized.

While in the descriptions of the first through the third embodiments, calculations such as the addition of the noise to the voice and the subtraction of the noise from the voice are performed in the spectrum domain or the cepstrum domain, these calculations of the addition and the subtraction mean combining the voice and the noise or the like in the spectrum domain or the cepstrum domain. For example, the adder 400 in FIG. 3 adds the cepstrum R^a(cep) of the uttered voice to the cepstrum Hm(cep) of the multiplicative distortion from the average calculator 7 to obtain the addition result Hm(cep)+R^a(cep), and this addition in the cepstrum domain means combining R^a(cep) with Hrm(cep). Moreover, the subtracter 21 in FIG. 3 subtracts the cepstrum Ha(cep) of the multiplicative distortion generated by the average calculator 20 from the cepstrum Ra(cep) of the uttered voice to obtain the subtraction result R^a(cep)=Ra(cep)−Hm (cep), and this subtraction in the cepstrum domain means combining Ra(cep) with Ha(cep), As described above, according to the voice recognition system of the present invention, since the combined model formed by combining the acoustic model with the noise model is formed in accordance with the information on the multiplicative distortion and the additive noise included in the uttered voice and the comparison with the uttered voice is performed based on the combined model, comparison with consistency is enabled, so that voice recognition robust against the multiplicative distortion and the additive noise is enabled.

What is claimed is:

1. A voice recognition system for comparing an uttered voice including a multiplicative distortion and an additive noise with a combined model obtained by combining a noise model with an acoustic model formed based on a voice including at least a multiplicative distortion to perform voice recognition, the voice recognition system comprising;
   a first extracting section for extracting a feature component of the multiplicative distortion included in the uttered voice;
   a second extracting section for extracting a feature component of a multiplicative distortion included in the acoustic model;
   a first calculating section for combining the uttered voice with the feature component of the multiplicative distortion extracted by the first extracting section;
   a second calculating section for combining the acoustic model with the feature component of the multiplicative distortion extracted by the second extracting section;
   a third calculating section for combining the noise model with the feature component of the multiplicative distortion extracted by the first extracting section; and
   a forming section for combining a result of the calculation by the second calculating section with a result of the calculation by the third calculating section to form the combined model, and
   wherein voice recognition is performed by comparing a result of the calculation by the first calculating section with the combined model.

2. A voice recognition system for comparing an uttered voice including a multiplicative distortion and an additive noise with a combined model obtained by combining a noise model with an acoustic model formed based on a voice including at least a multiplicative distortion to perform voice recognition, the voice recognition system comprising:
   a first extracting section for extracting a feature component of the multiplicative distortion included in the uttered voice;
   a second extracting section for extracting a feature component of a multiplicative distortion included in the acoustic model;
   a first calculating section for combining the uttered voice with the feature component of the multiplicative distortion extracted by the first extracting section;
   a second calculating section for combining the noise model with the feature component of the multiplicative distortion extracted by the first extracting section and with the feature component of the multiplicative distortion extracted by the second extracting section;
   a forming section for forming the combined model by combining the acoustic model with a result of the calculation by the second calculating section; and
   a third calculating section for combining the combined model with the feature component of the multiplicative distortion extracted by the second extracting section, and
   wherein voice recognition is performed by comparing a result of the calculation by the first calculating section with a result of the calculation by the third calculating section.

3. A voice recognition system for comparing an uttered voice including a multiplicative distortion and an additive noise with a combined model obtained by combining a noise model with an acoustic model formed based on a voice including at least a multiplicative distortion to perform voice recognition, the voice recognition system comprising;

- a first extracting section for extracting a feature component of the multiplicative distortion included in the uttered voice;
- a second extracting section for extracting a feature component of a multiplicative distortion included in the acoustic model;
- a first calculating section for combining the uttered voice with the feature component of the multiplicative distortion extracted by the first extracting section and with the feature component of the multiplicative distortion extracted by the second extracting section;
- a second calculating section for combining the noise model with the feature component of the multiplicative distortion extracted by the first extracting section and with the feature component of the multiplicative distortion extracted by the second extracting section; and
- a forming section for forming the combined model by combining the acoustic model with a result of the calculation by the second calculating section, and wherein voice recognition is performed by comparing the result of the calculation by the first calculating section with the combined model.

* * * * *